United States Patent [19]
Haun et al.

[11] 3,940,796
[45] Feb. 24, 1976

[54] CARD READOUT APPARATUS

[75] Inventors: Marion W. Haun, Torrance; Robert J. Mos, Huntington Beach; Arthur W. Riley, Sylmar, all of Calif.

[73] Assignee: American Magnetics Corporation, Torrance, Calif.

[22] Filed: Apr. 5, 1974

[21] Appl. No.: 458,366

[52] U.S. Cl.............................. 360/109; 235/61.11 D
[51] Int. Cl.².. G11B 5/56; G11B 21/24; G06K 7/08
[58] Field of Search .................. 360/2, 88, 104, 109; 235/61.11 E, 61.11 B, 61.11 A, 61.11 D, 61.7 B

[56] References Cited
UNITED STATES PATENTS

| | | | |
|---|---|---|---|
| 3,276,002 | 9/1966 | Handley | 360/88 |
| 3,310,791 | 3/1967 | Fischer | 360/109 |
| 3,419,710 | 12/1968 | Matthews et al. | 235/61.11 |
| 3,514,754 | 5/1970 | Schwend | 340/149 |

Primary Examiner—Daryl W. Cook
Assistant Examiner—David K. Moore
Attorney, Agent, or Firm—Jessup & Beecher

[57] ABSTRACT

An apparatus is provided in which a card, such as a credit card, carrying a magnetic strip of one or more tracks of coded data is inserted. Manual operation of an external crank or lever causes the card to be drawn into the apparatus. At the end of the stroke, the carrier in which the card rides is freed from the crank and returns at a constant, spring-driven speed, past a magnetic readout head, the output of which is connected to any suitable decoding circuit. The readout head is gimbaled so that it can ride with constant pressure against the magnetic strip on the card while at the same time adjusting itself to undulations or other slight deformations in the card. There is no significant amount of magnetic material within magnetic range of the readout head, so that danger of spurious signals being injected into the decoding circuit is minimized.

4 Claims, 8 Drawing Figures

CARD READOUT APPARATUS

DESCRIPTION OF THE PREFERRED EMBODIMENT

Figure 1:
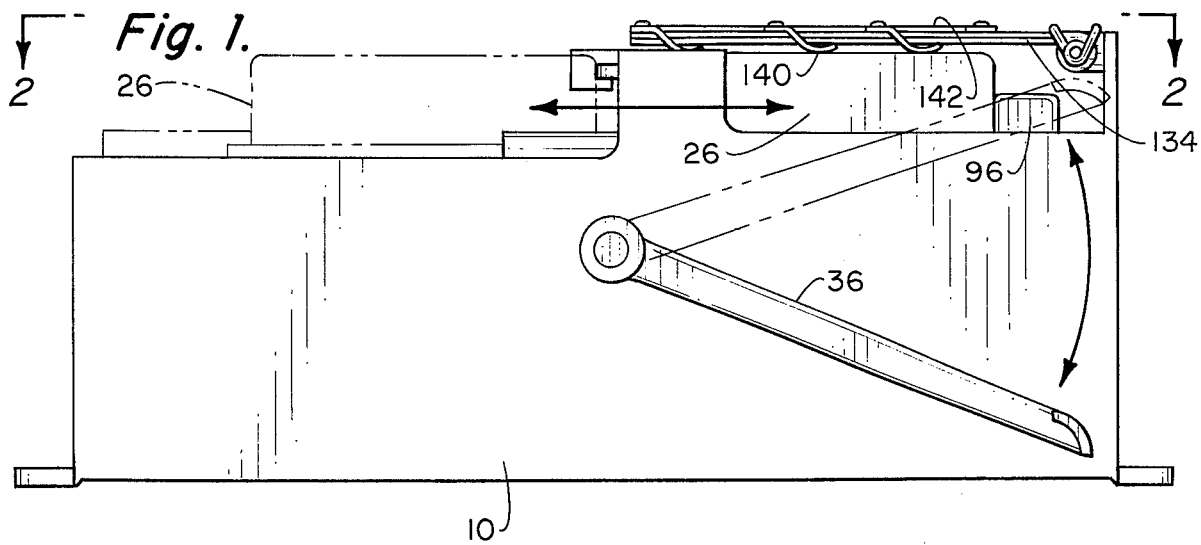
FIG. 1 is a side elevation of the apparatus.

The apparatus comprises a housing or case 10 within which is fixedly mounted a rod 12 forming a guide means along which a card carrier 14 is reciprocated back and forth on a linear path. The carrier 14 includes integral therewith a cylinder 16 coaxially circumjacent and mounted upon the rod 12, which forms a sliding path for the reciprocation of the carrier 14. The rod 12 emerges from the cylinder 16 through respective end walls 18 and 20 which are slidingly sealed to the rod 12 by low-friction gaskets 22.

Figure 7:
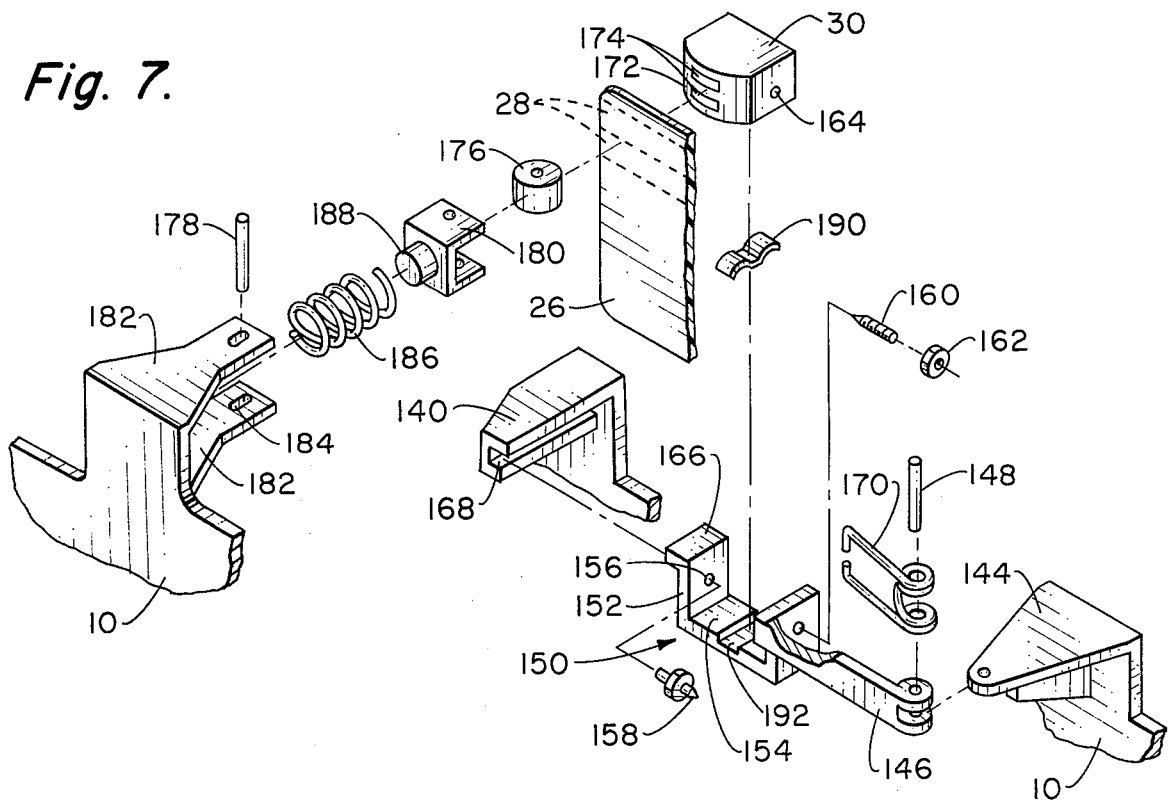
FIG. 7 is an exploded perspective view of the magnetic readout head and its mounting.

The carrier 14 has a slot 24 opening laterally of the path of movement of the carrier and adapted to receive a thin record member in the form of a flat card 26. Card 26 has thereon a magnetic strip 28 on which there are a plurality of parallel magnetic coded tracks (in this example two), which are adapted to be read out by a magnetic readout head 30. (FIG. 7)

The carrier 14 is moved from a starting position adjacent one end 32 of its path formed by the rod 12, to the opposite or stop end 34 of the rod. This movement is effected by rotation of a manually operable actuating crank or lever 36 operating through a drive means in the form of a gear train 38 (FIG. 8) which includes a rack 40 on the carrier 14. The carrier 14 is moved to the right (FIGS. 1, 2, 4, 6) by rotating the crank 36 downward through an arc of about 30 degrees as shown in FIG. 1. The crank 36 is secured by a pin 42 (FIG. 8) to a shaft 44 journaled in the housing 10. Slideable on the shaft 44 is a clutch ring 46 keyed to the shaft by a pin 48 passing through a longitudinal diametric slot 50 formed in the shaft 44. In this way rotation is imparted to the ring 46 while longitudinal or axial movement on the shaft 44 is still permitted within the limits of the slot 50. Sloping or oblique cam faces 52 on the clutch ring 46 engage complementary faces 54 on a segment gear 56 freely journaled on the shaft 44 and forming the first gear in the gear train 38.

Another shaft 58 is secured to the housing 10 parallel to the shaft 44. This is done by mounting the shaft 58 in an interior boss 60 and secured by a pin 62. Freely journaled on the shaft 58 is a gear 64 having a brake drum 66 forming a portion of a unidirectional braking means for preventing return of the carrier 14 if the crank 36 is prematurely released. The gear 64 is secured by pins 68 to a larger gear 70 also journaled on the shaft 58, which gear meshes with a pinion 72 freely journaled on the shaft 44 and meshing with the rack 40.

Figure 3:
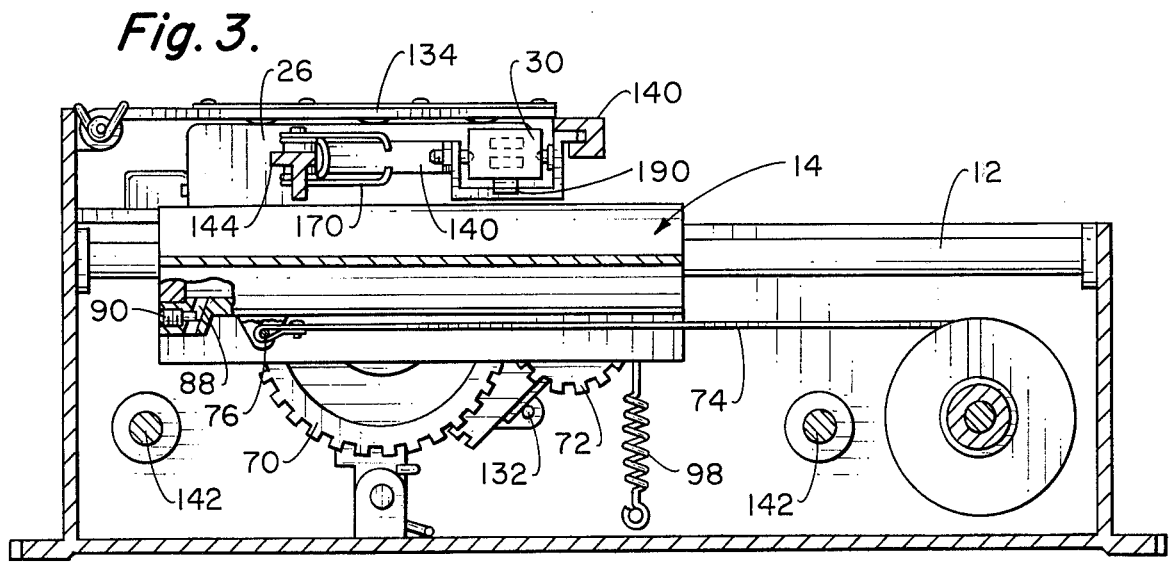
FIG. 3 is a sectional elevation taken on line 3—3 in FIG. 2.
Figure 4:
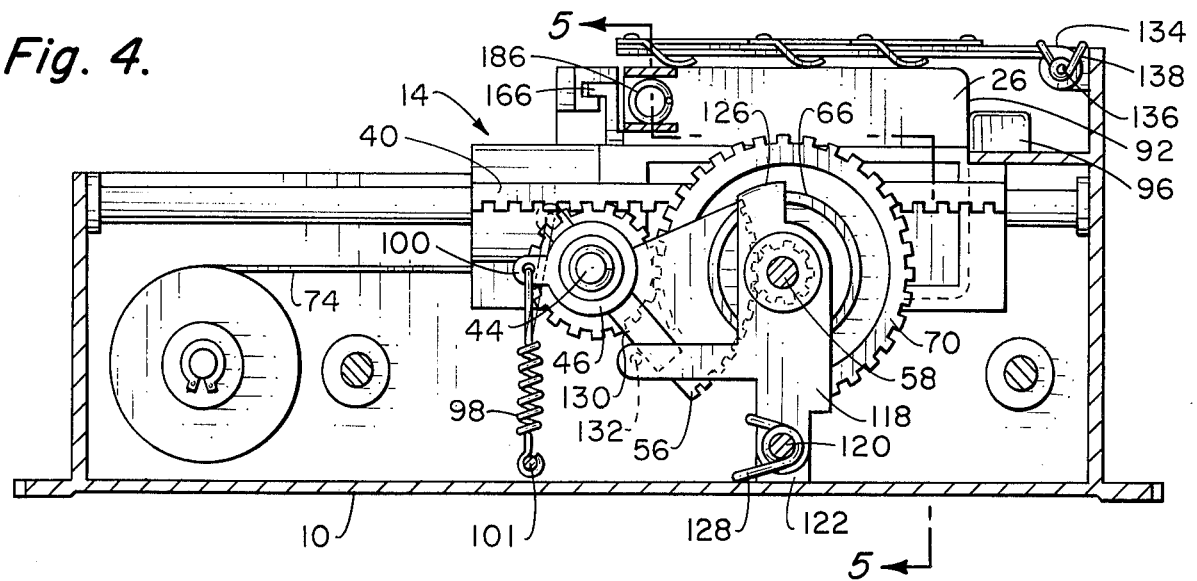
FIG. 4 is a sectional elevation taken on line 4—4 in FIG. 2.
Figure 6:
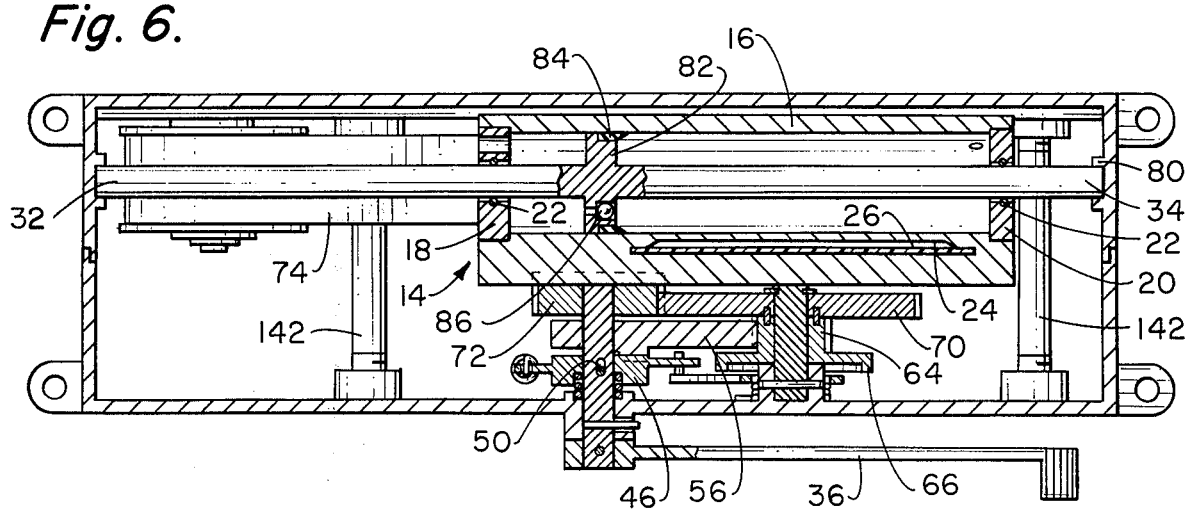
FIG. 6 is a sectional plan taken on line 6—6 in FIG. 5.

Mounted to the housing 10 beneath the starting end 32 of the guide rod 12 is a spiral, constant force, drive or return spring 74 of the negator type which serves to bias the carrier 14 to the left (FIGS. 4 and 6). The free end of the spring 74 is secured to the carrier 14 at 76 (FIG. 3) and serves to return the carrier 14 to the starting end of the rod 12 after it has been moved to the opposite or stop end 34 and then released, as will be described hereinafter.

The clutch ring 52 is pressed into clutching engagement with its complement, the segment gear 56, by a compression spring 78 circumjacent the shaft 44. The force of spring 78 is normally sufficient to keep the cam faces 52 and 54 in firm engagement and thus transmit the arcuate rotation of the shaft 44 to the gear segment 56 and thence through the gears 64, 70, 72 to the rack 40 and move the carrier 14 to the right from the starting position 32 of its path to the stop position 34. At the end 34 of the rod 12, the end plate 20 of the cylinder abuts the end wall of the housing 10 by striking an interiorly directed boss 80. Continued rotation of the clutch ring 46 beyond this point forces the cam faces 52 and 54 out of engagement by moving the ring 46 axially against the bias of the spring 78.

As soon as the cam faces 52 clear the faces 54, the gear train 38 is effectively freed from the shaft 44, and the carrier 14 is then moved back to the left in FIG. 6 at a constant speed by the constant force negator spring 74.

Although the force exerted by the spring 74 is substantially constant over its working range, the carrier 14 would nonetheless accelerate during this travel excursion. To maintain constant velocity, the aforementioned cylinder 16 is provided, which in addition to serving as the guide means for the carrier 14 on the rod 12, also serves as part of a dash pot means, the complementary part of which is a piston 82 on the rod 12 within the cylinder 16 and having a piston ring 84 therearound.

The operating cycle of the apparatus involves a movement of the cylinder 16 from the left to the right, so that the piston 82 at the start occupies a position in the right end of the cylinder 16 and then at the stop position occupies a position in the left end of the cylinder 16 as seen in FIG. 6. In this stroke of the movement, i.e. when the card 26 is being moved into the machine and preparatory to read out, minimum resistance is desired. Therefore means are provided for allowing ready exit of air from the left-hand side of the piston 82 and ready ingress of air to the right-hand side of the piston 82. While this may be done by valving in the body of the cylinder 16, in this embodiment it is done by a ball check valve 86 in the piston 82 itself which allows unobstructed flow of air to the right in FIG. 6. Thus as the carrier 14 and cylinder 16 move to the right in FIG. 6, minimum resistance is encountered. On the return stroke, driven by the bias spring 74, speed control is essential; and therefore escape of air from the right-hand side of the cylinder 16 is under control of an adjustable bleed orifice 88, the flow resistance of which is controlled by a threaded needle valve 90 (FIG. 3). The action of the piston 82 in the cylinder 16 thus constitutes a unidirectional pneumatic dash pot which stabilizes the return speed of the carrier 14, driven by the biasing spring 74, to a constant value. This is highly important to the proper readout of the magnetic data coded onto the card 26. The coding on the card is so positioned that readout does not start until a short distance after the clutch faces 52/54 have been disengaged and the return stroke has started under the influence of the spring 64. This allows the action of the dash pot to stablize the carrier velocity before readout starts by the magnetic head 30.

Just a small fraction of an inch before the end wall 20 of the cylinder 16 comes against the abutment stop 80 (FIG. 6) to bring about disengagement of the clutch faces 52/54, the right-hand edge 92 of the card 26 (FIG. 4) engages the arm 94 of a microswitch 96 mounted on the interior of the casing. Even momentary closing of the switch 96 effectuates a circuit lock into the readout circuitry connected to the magnetic readout head 30. The return of the card 26 past the head 30 in the return stroke of the carrier 14 brings about a reading of the coded data on the magnetic strip 28, irrespective of whether the crank arm 36 is allowed to return or not. Thereafter, when the crank 36 is released, it is returned to its uppermost position by the action of a return spring 98 tensioned between a short arm 100 on the clutch ring 46 and a stud 101 in the housing 10 projecting inward from the housing 10.

Figure 8:
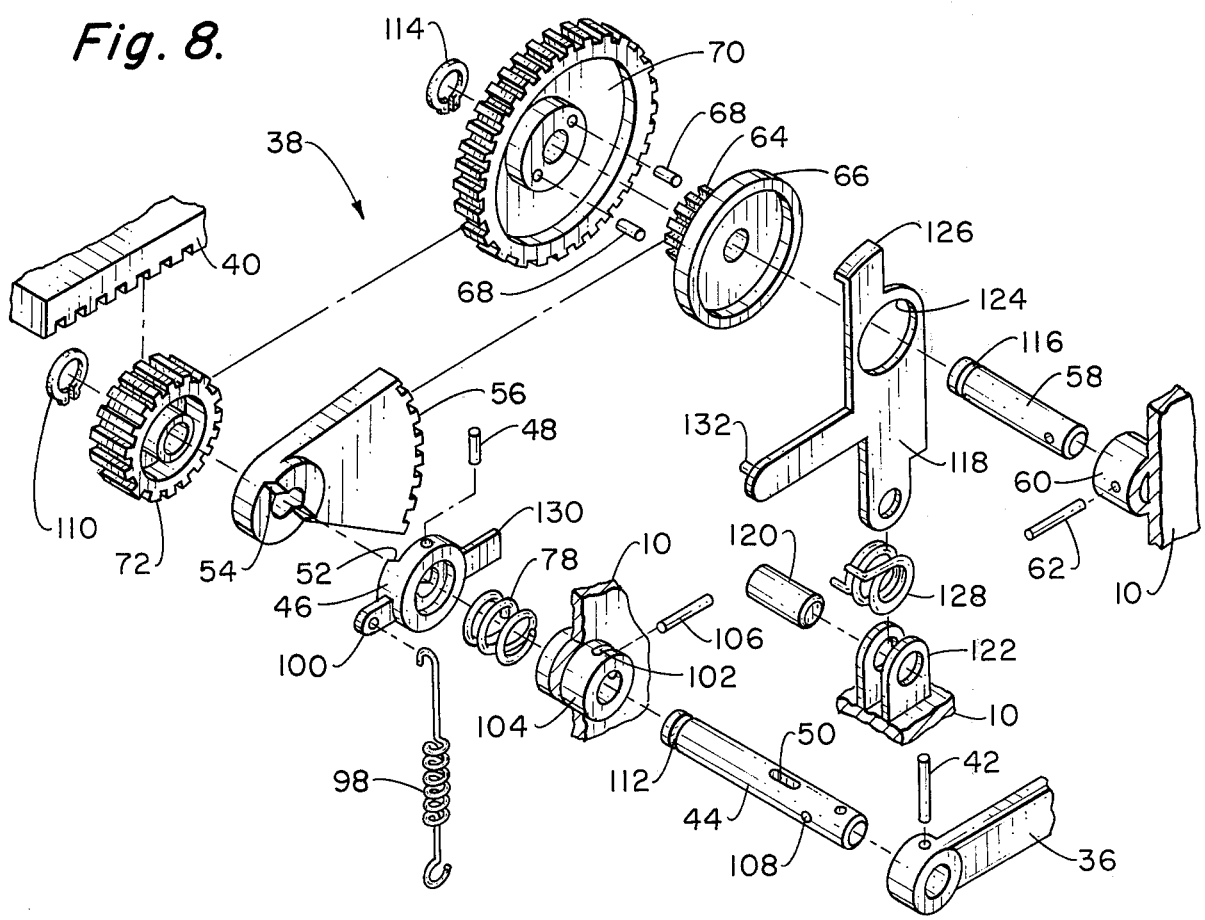
FIG. 8 is an exploded perspective view of the gear train by which the manually actuable crank or lever drives the card carrier into the apparatus for automatic return by the return spring.

The arcuate limits of oscillation of the crank 36 are determined by an arcuate slot 102 formed in a boss 104 on the housing 10, within which oscillates a pin 106 pressed into and extending from a diametral bore 108 formed in the shaft 44. As seen in FIG. 8 the various parts 78, 46 and 72 on the shaft 44 are held in place by a snap ring 110, which rides in a circumferential groove 112 on the inwardly extending end of the shaft 44. Similarly a snap ring 114 seated in a groove 116 in the inner end of the shaft 58 retains in position the parts journaled on that shaft.

If an inexperienced operator should release the crank 36 before he has moved it through its full excursion to close the switch 96, the drive spring 74 would return the carrier 14 to its starting position and the spring 98 would return the crank 36. Yet there would be no readout, and the inexperienced operator might conclude that there was something wrong with the machine or with the readout circuitry. To preclude this, there is provided the aforementioned unidirectional brake means in the form of a brake plate 118 pivoted on a gudgeon 120 mounted in a pair of mounting brakets 122 extending inwardly from the housing 10. The free end of the plate 118 has a large hole 124 through which extends the shaft 58, and at the extreme end of the plate 118 is a laterally extending arcuate brake shoe 126 which overhangs the brake drum 66.

As shown in FIG. 4, the shoe 126 engages the drum 66 to the left of a line projected through the shafts 120 and 58. A torsion spring 128 mounted circumjacent the gudgeon 120 biases the plate 118 clockwise, thus biasing the shoe 126 into engagement with the drum 66. Rotation of the drum 66 as the crank 36 is moved downward is in a counterclockwise direction, so that the brake engagement is relieved and the gear train can move freely in that direction. However, should the crank 36 be released at any time prior to its full stroke, the clockwise rotation of the drum 66 (FIG. 4) would bring the two parts 66 and 126 into firm frictional engagement, thereby braking any return movement of the carrier 14 under the influence of the return spring 74.

To free the brake shoe 126 from the drum 66 at the stop end of the stroke, the clutch ring 46 is provided with an arm 130 which engages a pin 132 on the plate 118 just a fraction of an inch after the shaft 44 has moved the clutch ring 46 far enough to disengage the cam surfaces 52/54, and before the pin 106 has reached the end of its stroke in the arcuate slot 102. Thus as the operator completes the downward stroke of the crank 36, the arm 130, pressing on the pin 132, rotates the plate 118 counterclockwise sufficiently to relieve the frictional engagement of the shoe 126 against the drum 66. Thus the return spring 74 is free to drive the card 26 past the head 30 and effectuate the desired code readout.

Figure 2:
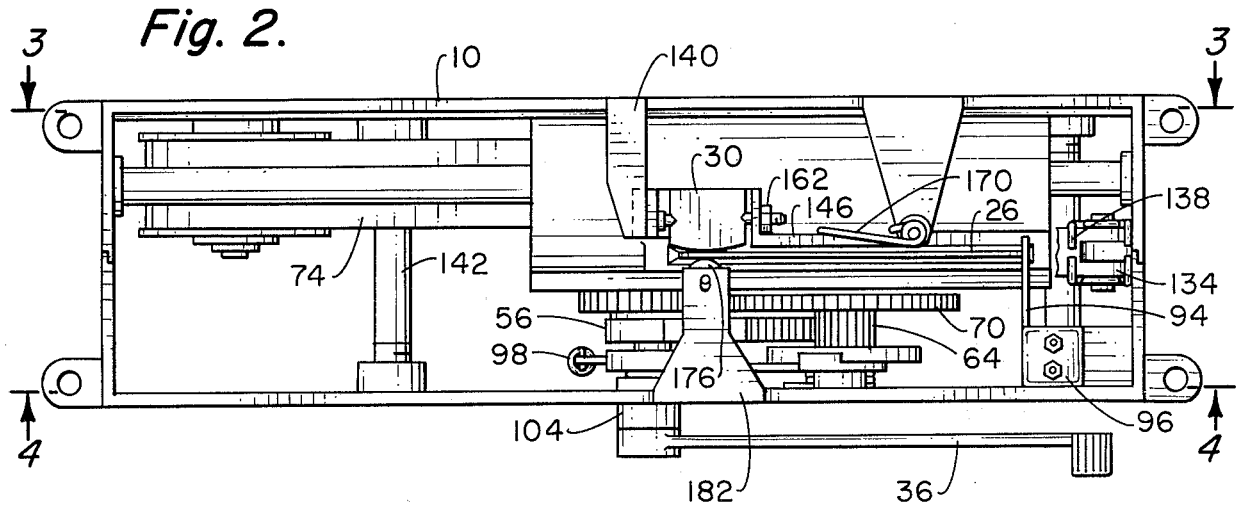
FIG. 2 is a top plan view taken on line 2—2 in FIG. 1.
Figure 5:
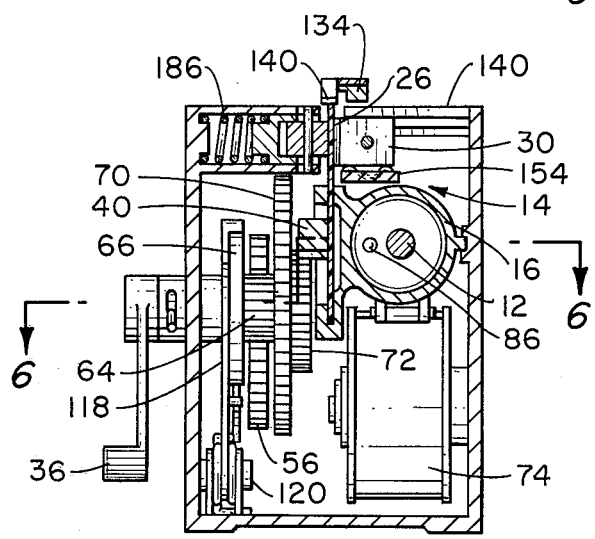
FIG. 5 is a cross-section taken on line 5—5 in FIG. 4.

The card 26 is retained firmly in the slot 24 of the carrier 14 by a retaining arm 134 hinged to the frame 10 at pivot 136 and biased counterclockwise (FIG. 4) by a torsion spring 138. A series of leaf springs 143 are lanced downwardly from an elongate plate 142 riveted to the arm 134. The hinge spring 138 biases the arm 134 downward against a bracket 140 extending inwardly from the housing 10 as shown in FIGS. 2 and 5. This places the leaf springs 140 in position to resiliently engage the top edge of the card 26 as it is being carried back and forth by the carrier 14. However, should jamming occur at any time during the use of the machine, the arm 134 may be retracted upward and the exposed upper edge of the card 26 readily grasped to extract the card from the carrier 14. Thus the card is not trapped within the confines of the machine, but is readily accessible at all time, irrespective of the point of operation at which jamming might possibly occur.

The housing 10 is made in two parts as shown in FIGS. 2 and 6 held together by securing bolts 142.

In accordance with the present invention the readout head 30 is mounted so as to accommodate itself to slight irregularities or undulations in the card 26, at the same time being maintained in sufficiently exact registration with the magnetic strip 28 to assure accurate readout of the coded magnetic data. To this end the housing 10 is provided with an inwardly extending bracket 144 (FIG. 7) forming a pivotal support for a mounting arm 146 pivoted to the end of the bracket 144 by a pivot pin 148. The axis of pivot pin 148 lies thus in a plane parallel to the card 26 and transverse of its path of movement as it is reciprocated by the carrier 14. Adjacent the end of the arm 146 is formed a downwardly projecting head carrier 150, constituting a cradle for the readout head 30. The cradle 150 has a downwardly extending pair of gimbal arms 152 connected by a bottom 154. In the respective arms 152 are formed aligned bores 156, in one of which is mounted a fixed pointed pivot pin 158 and in the other of which is mounted an adjustable pointed pivot pin 160, the adjustment being provided by the threading of the pin 160 in a nut 162 secured to the gimbal arm. The pins 158 and 160 ride in respective sockets 164 in the head 30, and thereby support the head in the cradle 150 for pivotal adjustment about an axis paralleling the path of movement of the card 26.

Precise vertical, i.e. lateral, relationship of the readout head 30 with respect to the magnetic strip 28 on the card 26 is provided by restraining the free end of the arm 146 against vertical movement, while still permitting horizontal movement brought about by pivoting of the arm 146 about the pivot pin 148. This is effected by a short projection 166 extending from the cradle 150 into a horizontal groove 168 formed in the bracket 140. A torsion spring 170 circumjacent the pivot pin 148 bears against the arm 146 and biases the head 30 against the card 26. This beings the convex face 172 of the head 30 into firm readout engagement against the magnetic strip 28 with its coded data thereon. In the example shown, two pickup cores 174 have been shown in the head for picking up a respective pair of parallel signal paths in the magnetic strip 28; but, of course, any number of such parallel paths may be provided.

The head 30 biased by the spring 170 presses the card 26 against an abutment in the form of a roller 176 having an axle 178 journaled in a U-shaped trunnion bearing 180. The ends of axle 178 also serve to mount the trunnion bearing 180 in a bracket 182 extending inwardly from the housing 10 and having elongate mounting bores 184. These bores mount trunnion bearing 180 with limited back-and-forth movement, biased by a compression spring 186 held in place by a boss 188 on trunnion bearing 180. In this way the card 26, as it moves in and out on the carrier 14, is pinched resiliently between the readout head 30 and the abutment roller 176. The curved periphery of roller 176 complements the convex face 172 to provide accurate and precise readout of the magnetic strip 28.

The head 30 is centered resiliently in its mounting on the pivot pins 158/160 by a double arc leaf spring 190 seated in a groove 192 in the bottom portion 154 of the cradle 150. In this way the head is centered in the cradle 150, with slight pivotal adjustment about the axis 158/160 being permitted, thereby allowing the readout cores 174 to accommodate themselves to slight undulations or irregularities in the card 26.

Since the present apparatus is manually powered rather than by electric motor, it is possible to render the pickup circuitry much less vulnerable to spurious signals by confining magnetic materials to those in the head 30. All other parts of the apparatus within magnetic range of the head or the magnetic strip 28 are made of non-magnetic material, such as plastic. The centering spring 190, for example, is preferably made of berillium copper, so as to have no magnetic influence on the pickup function of the head 30.

What is claimed is:

1. Signal head assembly comprising:
    carrier means for carrying a thin flat record member adapted to have signal data recorded thereon;
    means for mounting said carrier means for movement along a given path;
    a signal head having a convex face and located adjacent said path with said face in position to bear against the record member;
    a mounting arm positioned substantially parallel with said path and having a cradle formed therein;
    means for mounting said arm for pivoting about an axis substantially parallel to said member and transverse to said path;
    means for mounting said head in said cradle for pivoting about an axis substantially parallel to said path;
    means for biasing said head against a record member held in said carrier;
    abutment means opposite said head against which the member is pressed by said head.

2. Head assembly in accordance with claim 1 wherein:
    said arm mounting means is located at one end of said arm;
    means at the other end of said arm for restricting movement of said other end to an arcuate path centered on said arm mounting axis.

3. A magnetic head mounting for assuring accurate position of the head against a magnetic strip comprising:
    an arm attached to a pivot at one end for rotation about a vertical axis and slideably supported in a grooved bracket at the opposite end;
    a spring biasing said arm for rotation about a vertical axis;
    a downward projecting head carrier in said arm forming two parallel gimbal arms and a bottom;
    first and second pointed pivot pins passing through the gimbal arms and engaging sockets on either side of the magnetic head;
    whereby said magnetic head may rotate about horizontal axis.

4. Head mounting assembly in accordance with claim 3 wherein:
    at least one of said pointed pivot pins is adjustable;
    a leaf spring is mounted in a groove in the bottom of the head carrier for centering the magnetic head about the horizontal axis.

* * * * *